United States Patent [19]

Yamamoto et al.

[11] Patent Number: 5,160,362
[45] Date of Patent: Nov. 3, 1992

[54] PROCESS FOR MANUFACTURING OPTICAL ELEMENT

[75] Inventors: Kiyoshi Yamamoto, Yokohama; Tetsuo Kuwabara, Urawa; Isamu Shigyo, Chiba; Masaki Ohmori, Kawasaki; Fumitaka Yoshimura, Yokohama, all of Japan

[73] Assignee: Canon Kabushiki Kaisha, Tokyo, Japan

[21] Appl. No.: 621,981

[22] Filed: Dec. 4, 1990

[30] Foreign Application Priority Data

Dec. 6, 1989 [JP] Japan .................................. 1-315447

[51] Int. Cl.$^5$ .............................................. C03B 23/00
[52] U.S. Cl. ....................................... 65/102; 65/111; 65/274; 65/900
[58] Field of Search .................. 65/64, 66, 111, 157, 65/102, 900, 274, 32.1

[56] References Cited

U.S. PATENT DOCUMENTS

| | | | |
|---|---|---|---|
| 3,868,170 | 2/1975 | DeLuca | 65/3.12 |
| 4,098,596 | 7/1978 | Wu | 65/136 |
| 4,388,097 | 6/1983 | Turk | 65/102 |
| 4,734,118 | 3/1988 | Marechal | 65/102 |
| 4,756,737 | 7/1988 | Yoshimura et al. | 65/275 |
| 4,913,718 | 4/1990 | Yoshimura | 65/102 |
| 4,921,519 | 5/1990 | Schinker | 65/66 |
| 4,946,490 | 7/1990 | Hall | 65/DIG. 16 |

FOREIGN PATENT DOCUMENTS

| | | | |
|---|---|---|---|
| 4997009 | 9/1974 | Japan . | |
| 58-84134 | 5/1983 | Japan . | |
| 59-150728 | 8/1984 | Japan . | |
| 61-26528 | 2/1986 | Japan . | |
| 63-11529 | 1/1988 | Japan . | |
| 378199 | 9/1932 | United Kingdom . | |
| 822862 | 11/1959 | United Kingdom | 65/900 |

Primary Examiner—Joye L. Woodard
Attorney, Agent, or Firm—Fitzpatrick, Cella, Harper & Scinto

[57] ABSTRACT

In a process for manufacturing an optical element, in which a molding material is put in molds and is heated and press-molded to manufacture an optical element, a preheating treatment of the molding material is performed before it is put in the molds at a reduced pressure and a temperature lower than a temperature during the press molding.

3 Claims, 4 Drawing Sheets

5,160,362

PROCESS FOR MANUFACTURING OPTICAL ELEMENT

BACKGROUND OF THE INVENTION

1. Field of the Invention

The present invention relates to a process for manufacturing an optical element and, more particularly, to a process for obtaining an optical element having an optical function surface directly from a molding material by press molding.

2. Related Background Art

In recent years, a process for manufacturing an optical element having a high-precision optical function surface which requires no post-working operations such as grinding and polishing has been developed. In this process, a material for molding an optical element, e.g., a glass blank which is preliminarily molded to have a given shape and surface precision is put in molds having a predetermined surface precision, and is press-molded to manufacture an optical element.

In this press molding process, upper and lower mold members are slidably arranged in a shell mold member to oppose each other, and a molding material is introduced in a cavity defined by these upper, lower, and shell mold members. As an atmosphere for preventing the mold members from being oxidized, a non-oxidizing atmosphere, e.g., nitrogen atmosphere is selected, and the mold members are heated to a molding enable temperature, e.g., until the molding material has a viscosity of $10^8$ to $10^{12}$ P. The mold members are then closed, and are pressed for an appropriate period of time, thereby transferring the surface pattern of the mold members onto the surface of the molding material. The temperature of the mold members is decreased to a temperature sufficiently lower than a glass transition temperature of the molding material, the compression pressure is released, and the mold members are opened. Thus, a molded optical element is removed.

Note that a molding material may be preheated to an appropriate temperature before it is introduced into the mold members, or it may be heated to a molding enable temperature, and then may be introduced into the mold members. Furthermore, a molding material may be conveyed together with the mold members, so that heating, pressing, and cooling are performed at predetermined locations, thereby attaining continuous, high-speed operations.

The above-mentioned process for press-molding an optical element, and the apparatus therefor are disclosed in, e.g., Japanese Laid-Open Patent Application Nos. 58-84134 and 49-97009, GB Patent No. 378199, Japanese Laid-Open Patent Application Nos. 63-11529, 59-150728, and 61-26528, and the like.

In the press molding process for an optical element, as described above, a molding material and the mold members are often welded to each other. Once they are welded to each other, a molded element may be cracked due to a tensile force applied to the element based on a difference between the thermal expansion coefficients of the molded optical element and the mold members during cooling after molding, or when the molded optical element is removed from the mold members, a portion of the element may be attached to and left on the mold members, thus adversely influencing the molding operations.

In order to prevent welding, a parting agent may be used. However, as for an optical element, in particular, an optical function surface is required to have high smoothness. Thus, the use of the parting agent leads to degraded quality, e.g., a decrease in smoothness, a decrease in transparency, and the like when the parting agent remains. Therefore, it is not preferable to use the parting agent.

Materials of mold members which do not easily cause welding have been studied. However, prevention of welding by selecting materials of the mold members narrows a selection range of the materials of the mold members, resulting in disadvantages.

SUMMARY OF THE INVENTION

It is an object of the present invention to provide a process for manufacturing an optical element, which can eliminate welding between a molding material, or between a molded optical element and mold members, and can satisfactorily perform molding.

According to the present invention, in order to achieve the above object, there is provided a process for manufacturing an optical element, in which a molding material is put in molds, and is heated and press-molded to manufacture an optical element, comprising the step of performing a preheating treatment of the molding material at a reduced pressure and a temperature lower than a temperature during the press molding before the molding material is put in the molds.

According to an aspect of the present invention, a degree of vacuum in the preheating treatment is set to be 10 Torr or less.

According to another aspect of the present invention, a heating temperature in the preheating treatment is set to be 100° C. or more.

According to still another aspect of the present invention, the molding material having a shape corresponding to that of the optical element is used.

DETAILED DESCRIPTION OF THE PREFERRED EMBODIMENT

An embodiment of the present invention will be described below with reference to the accompanying drawings.

Figure 1:
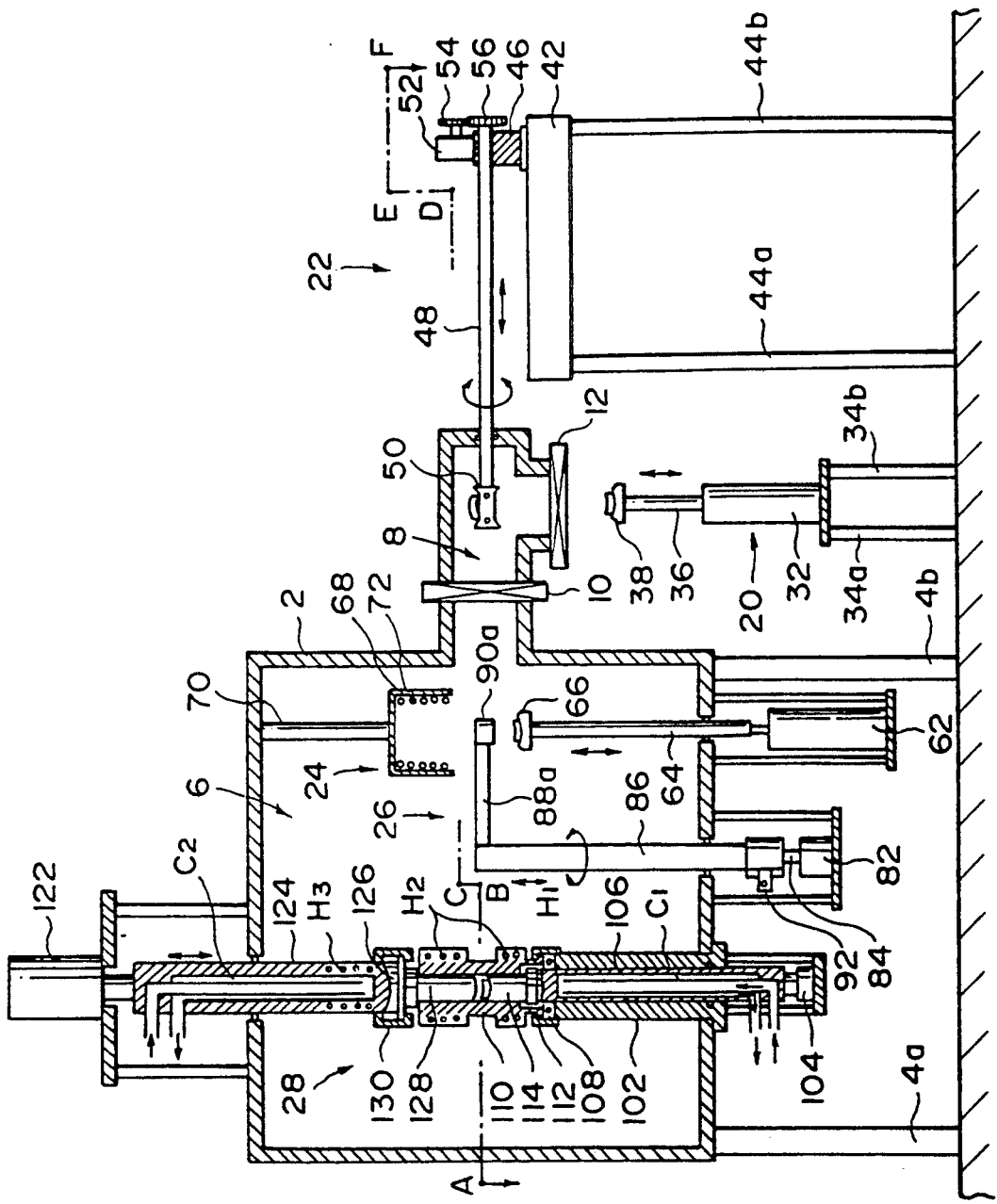
FIG. 1 is a schematic longitudinal sectional view showing a structure of an apparatus for carrying out a process for manufacturing an optical element according to the present invention.
Figure 2:
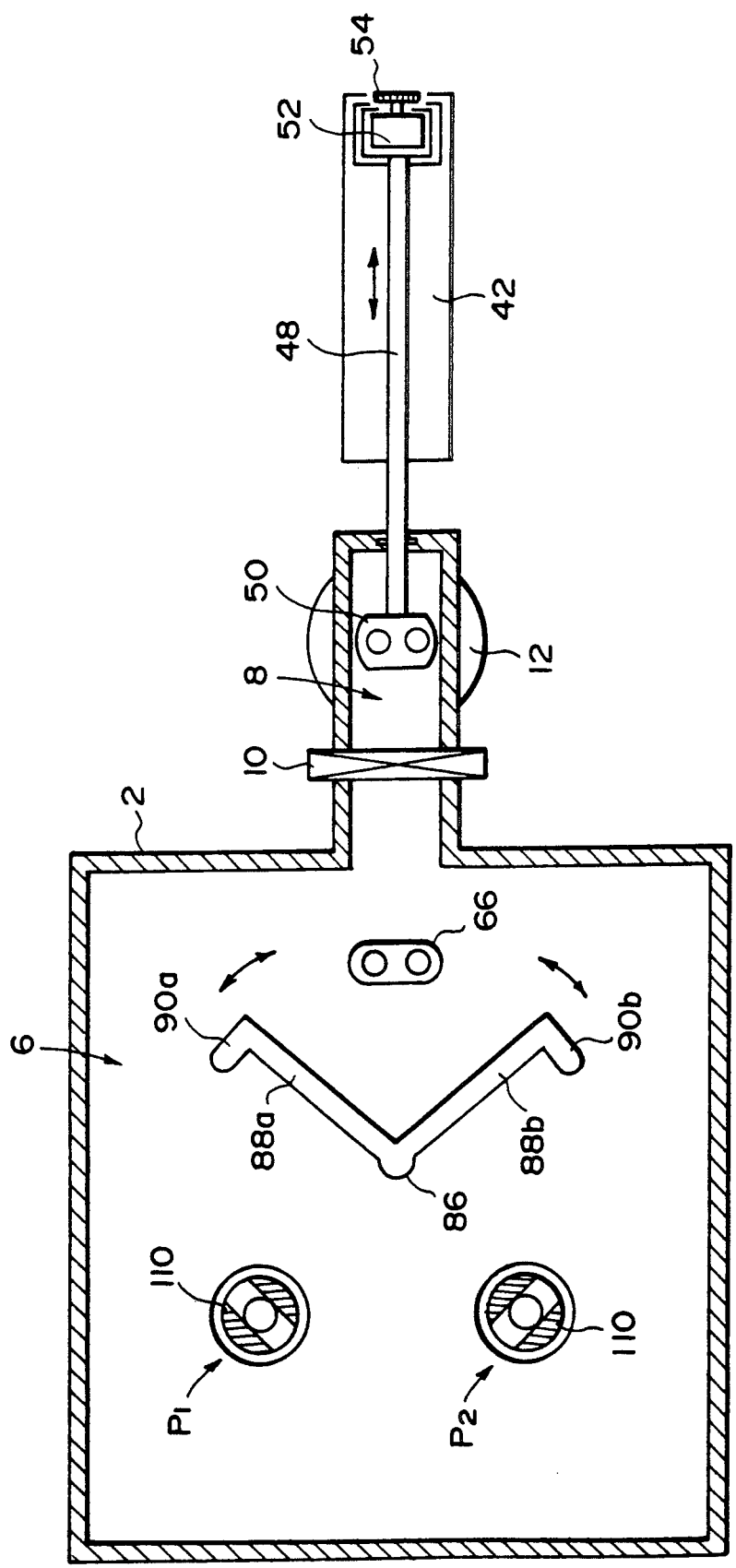
FIG. 2 is a sectional view taken along a line A-B-C-D-E-F of FIG. 1.

FIG. 1 is a schematic longitudinal sectional view showing a structure of an apparatus for carrying out a process for manufacturing an optical element according to the present invention, and FIG. 2 is a sectional view taken along a line A-B-C-D-E-F of FIG. 1.

In FIG. 1, a casing 2 is supported on support legs 4a and 4b. The casing 2 forms a molding room 6 and a transpose room 8 which can be shielded from external air. The molding room 6 and the transpose room 8 are partitioned by a sealing gate valve 10. The transpose room 8 is arranged just aside the molding room 6. A sealing gate valve 12 is arranged between the lower portion of the transpose room 8 and an external portion.

An insertion/removal means 20 for inserting a molding material from an external portion into the transpose room 8 and for taking out a molded optical element from the interior of the transpose room 8 to the external portion is arranged below the gate valve 12.

A convey means 22 for conveying a molding material in the transpose room 8 into the molding room 6, and conveying a molded optical element from the interior of the molding room 6 into the transpose room 8 is arranged near the transpose room 8.

A heating portion 24, a transfer portion 26, and a press portion 28 are disposed in the molding room 6.

In this embodiment, as shown in FIG. 2, two identical press portions $P_1$ and $P_2$ are arranged.

The heating portion 24 receives a molding material conveyed into the molding room 6 by the convey means 22, heats the material to an appropriate temperature, and receives a molded optical element from the transfer portion 26.

The transfer portion 26 transfers a molding material present in the heating portion 24 to the press portion 28, and transfers a molded optical element present in the press portion to the heating portion 24.

The press portion 28 heats a molding material transferred by the transfer portion 26 to an appropriate temperature, and presses it using mold members.

The respective portions will be described in detail below.

In the insertion/removal means 20, a cylinder 32 is supported on support legs 34a and 34b to extend vertically. A piston rod 36 is vertically moved by the cylinder 32. A table 38 for placing a molding material or a molded optical element thereon is mounted on the upper end of the piston rod 36. The table 38 has two placing portions in a direction perpendicular to the sheet surface of FIG. 1, so that two molding materials or molded optical elements are placed thereon in correspondence with the two press portions 28 ($P_1$ and $P_2$) in the molding room 6.

The upper and lower end positions of a vertical movement stroke of the table 38 are set to be located inside and outside the transpose room 8. Of course, when the table 38 is vertically moved, the gate valve 12 attached to the transpose room 8 is set in an open state.

In the convey means 22, a rodless cylinder 42 is horizontally supported on rodless cylinder support legs 44a and 44b to be directed toward the transpose room 8. A bearing member 46 is horizontally reciprocated by the rodless cylinder 42. One end portion of a horizontal convey shaft 48 parallel to the moving direction of the bearing member is attached to the bearing member to be pivotal about its axial direction. The other end portion of the convey shaft extends into the transpose room 8, and a chucking means 50 for chucking a molding material or a molded optical element is attached to the distal end of the other end portion of the convey shaft. A rotary cylinder 52 having an output gear 54 is mounted on the bearing member 46. A gear 56 meshing with the gear 54 is fixed to the distal end portion of the convey shaft 48. Therefore, the convey shaft 48 can be pivoted by the rotary cylinder 52.

The chucking means 50 has two chucking portions on each of upper and lower surfaces. These chucking portions are arranged in correspondence with the placing portions of the table 38 (FIG. 2). The chucking portions on the upper and lower surfaces are vertically reversed upon a 180° pivotal movement of the convey shaft 48. Note that the chucking means 50 incorporates a heater.

The chucking means 50 attached to the convey shaft 48 is horizontally moved from a position inside the transpose room 8 above the table 38 (position illustrated in FIG. 1) to a position of the heating portion 24 in the molding room 6. Of course, during the horizontal movement of the chucking means 50, the gate valve 10 between the transpose room 8 and the molding room 6 is set in an open state.

In the heating portion 24, a cylinder 62 is mounted on the casing 2 outside the molding room 6, and extends vertically. A piston rod 64 is vertically moved by the cylinder 62, and extends into the molding room 6 through the casing 2. A table 66 for placing a molding material or a molded optical element is mounted on the upper end of the piston rod 64. The table 66 has two placing portions in a direction perpendicular to the sheet surface of FIG. 1, so that two molding materials or molded optical elements are placed thereon (FIG. 2).

A heating cylinder 68 is arranged above the table 66 to be suspended by a support member 70. The cylinder 68 has a lower opening, and a heater 72 is mounted on the inner surface of the cylinder 68.

The table 66 is vertically moved from a position where the chucking means 50 reaches (position illustrated in FIG. 1) to a position in the heating cylinder 68.

In the transfer portion 26, a cylinder 82 is mounted on the cylinder 2 outside the molding room 6, and extends vertically. A piston rod 84 is vertically moved by the cylinder 82, and extends into the molding room 6 through the casing 2. A rotary sleeve 86 is arranged around the outer surface of the piston rod 84 to be relatively rotatable about the vertical direction. The sleeve 86 extends through the casing 2, and two horizontal arms 88a and 88b defining a Y shape are arranged on the upper end of the sleeve 86. Chucking means 90a and 90b are attached to the distal ends of these arms. One chucking means 90a corresponds to the press portion $P_1$, and the other chucking means 90b corresponds to the press portion $P_2$. Chucking portions are arranged on the lower surfaces of these chucking means. A drive means 92 pivots the sleeve 86 relative to the piston rod 84.

When the sleeve 86 is pivoted, the chucking means 90a must be pivoted from a position above the table 66 of the heating portion 24 to a position of the press portion 28 ($P_1$) including a middle position illustrated in FIG. 2, and the chucking means 90b must be pivoted from a position above the table 66 of the heating portion 24 to a position of the press portion 28 ($P_2$) including a middle position illustrated in FIG. 2.

In the press portion 28, a vertical stationary cylinder 102 is fixed to the casing 2. A cylinder 104 is mounted on the lower end portion of the stationary cylinder 102 outside the molding room 6, and extends vertically. A lower shaft 106 is connected to a piston rod of the cylinder 104 to be vertically moved by it. The lower shaft 106 is housed in the stationary cylinder 102 to be vertically slidable.

The lower end of a cylindrical shell mold member 110 is placed on the upper end of the stationary cylinder 102 via a ring-like heater plate 108. This lower end is fixed to the stationary cylinder 102 by a pressing ring 112. A lower mold member 114 is placed on the upper end of the lower shaft 106. The lower mold member 114 is housed in the shell mold member 110, and is vertically slidable with respect to the shell mold member 110.

A cylinder 122 is mounted on the casing 2 outside the molding room 6, and extends vertically. An upper shaft 124 is connected to a piston rod of the cylinder 122 to be vertically moved by it. The upper shaft 124 is coaxially arranged above the lower shaft 102. The lower end face of the upper shaft 124 has a convex spherical shape. A spherical washer 126 has a concave spherical upper surface corresponding to the convex spherical shape. The spherical washer 126 has an automatic centering function during a press operation. An upper-end flange portion of an upper mold member 128 is arranged under the spherical washer 126, and is locked by a pressing ring 130 for fixing the upper shaft. The upper mold member 128 is housed in the shell mold member 110, and is vertically slidable with respect to the shell mold member 110.

The upper end face of the lower mold member 114 and the lower end face of the upper mold member 128 serve as transfer surfaces for forming optical function surfaces of an optical element to be molded, and are finished to have desired surface precision.

Coolant communication paths $C_1$ and $C_2$ are respectively formed in the lower and upper shafts 106 and 124. Heaters $H_1$, $H_2$, and $H_3$ are incorporated in the heater plate 108, the shell mold member 110, and the lower portion of the upper shaft 124, respectively.

Figure 3:
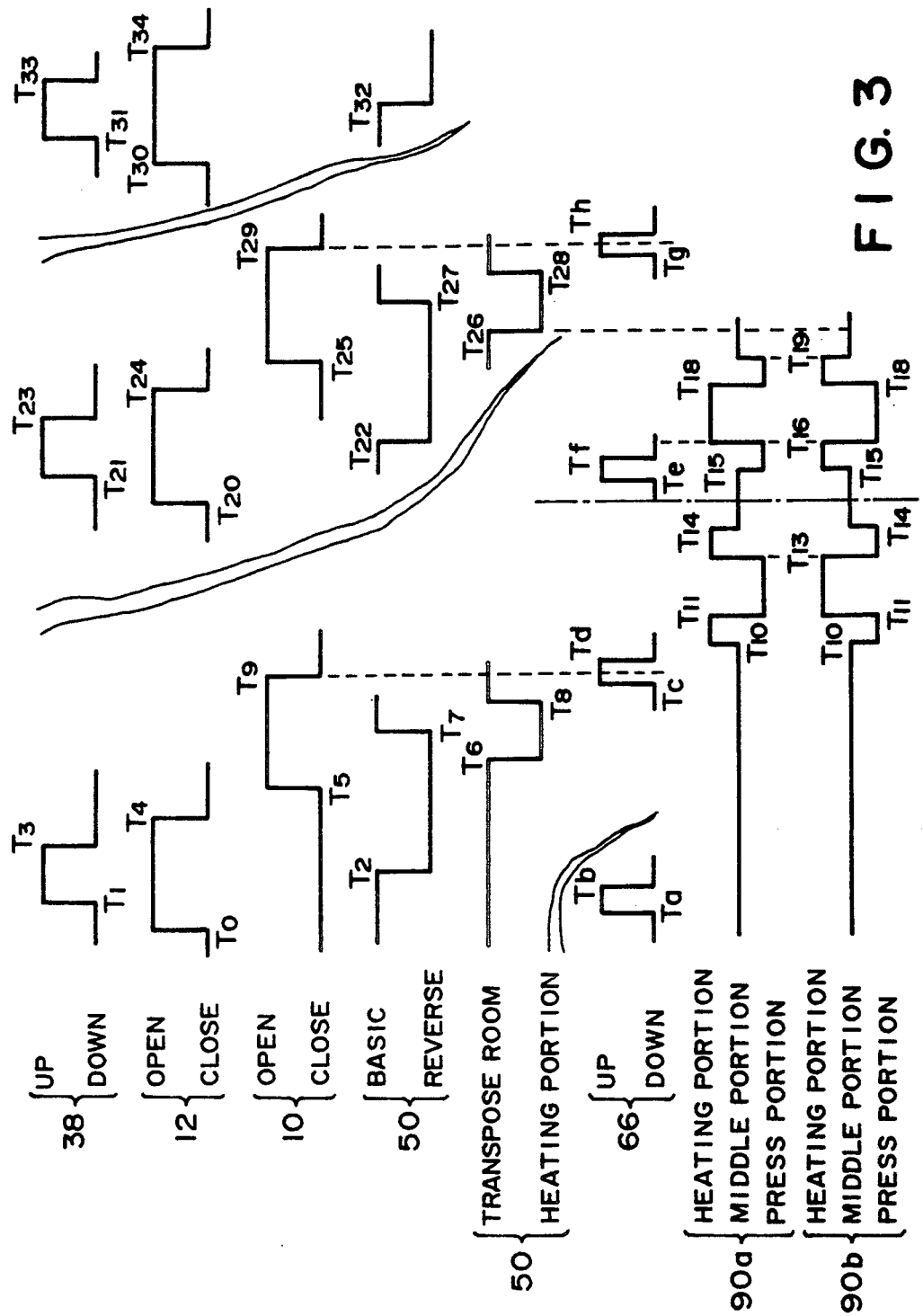
FIG. 3 is a timing chart showing operation timings of respective portions of the apparatus for carrying out the process for manufacturing an optical element according to the present invention.

Operations of the above-mentioned apparatus will be described below. FIG. 3 shows operation timings of the respective portions.

The interior of the molding room 6 is filled with a nitrogen atmosphere by a nitrogen gas supply system (not shown). In an initial state, the gate valves 10 and 12 are closed.

The gate valve 12 is opened ($T_0$), and two molding materials are placed on the table 38 located at a lower position illustrated in FIG. 1, and the table 38 is moved upward by the cylinder 32. Thus, the table 38 is introduced into the transpose room 8 through the gate valve 12 ($T_1$). The molding materials are chucked by the chucking portions on the lower surface of the chucking means 50. The pivot position of the chucking means 50 at this time is determined as a basic state, and a state pivoted from the basic state through 180° is determined as a reverse state. The chucking operation is attained by an air suction means (not shown).

The table 38 is moved slightly downward, and the convey shaft 48 is rotated through 180° by the rotary cylinder 52. Thus, the chucking means 50 is vertically reversed in the transpose room 8 ($T_2$). Thus, the molding materials are located on the upper surface side of the chucking means 50.

The table 38 is moved downward from the position in the transpose room 8 to the lower position outside the transpose room ($T_3$).

The gate valve 12 is then closed ($T_4$), and a pressure inside the transpose room 8 is reduced by a pressure reducing means (not shown). Thereafter, the molding materials are preheated by the heater incorporated in the chucking means 50.

The preheating operation is performed at a degree of vacuum of 10 Torr or less, preferably, 1 Torr or less, and more preferably, 0.1 Torr or less. In addition, the preheating operation is performed at a temperature of 100° C. or higher. Furthermore, the preheating operation is performed for 10 seconds or more, preferably 30 seconds or more, and more preferably 1 minute or more.

With this preheating operation, foreign matters attached to the surfaces of the molding materials are removed.

Nitrogen gas is supplied into the transpose room 8 by the nitrogen gas supply system (not shown) to fill the interior of the transpose chamber with the nitrogen atmosphere. Thereafter, the gate valve 10 is opened ($T_5$).

The convey shaft 48 is moved toward the molding room 6 by the cylinder 42, so that the chucking means 50 is located above the table 66 at the lower limit position of the heating portion 24 in the molding room 6 ($T_6$).

At this position, the convey shaft 48 is rotated through 180° by the rotary cylinder 52, so that the chucking means 50 is vertically reversed ($T_7$).

The table 66 is moved slightly upward by the cylinder 62 of the heating portion, and the molding materials chucked on the lower surface side of the chucking means 50 are placed on the table 66 by releasing chucking.

The table 66 is moved upward to an upper limit position by the cylinder 62 prior to arrival of the chucking means 50 ($T_a$), and is located in the heating cylinder 68 for an appropriate period of time to be heated to an appropriate temperature. Thereafter, the table 66 is moved downward to a lower position illustrated in FIG. 1 ($T_b$). Therefore, when the molding materials are placed on the table 66, they can be prevented from being cracked due to temperature shock.

The table 66 is then moved slightly downward to the lower limit position, and the convey shaft 48 is horizontally moved, thereby moving the chucking means 50 backward to the transpose room 8 ($T_8$). Thereafter, the gate valve 10 is closed ($T_9$).

Note that the table 66 which carries the molding materials is moved upward to the upper limit position by the cylinder 62 after $T_8$ and before $T_9$ ($T_c$). Thus, the table 66 is placed in the heating cylinder 68 for an appropriate period of time to be heated to an appropriate temperature. After $T_9$, the table 66 is moved downward to the lower position illustrated in FIG. 1 ($T_d$).

The arms 88a and 88b are pivoted by the pivot drive means 92. First, the chucking means 90a is located above the table 66 ($T_{10}$), and the table 66 is moved slightly upward by the cylinder 62 of the heating portion, so that a first molding material on the table 66 is chucked by the chucking means 90a. Thereafter, the table 66 is moved slightly downward. The chucking operation is attained by the air suction means (not shown).

Then, the arms 88a and 88b are pivoted by the pivot drive means 92, so that the chucking means 90a is moved to the first press portion $P_1$ ($T_{11}$). The molding material $G_1$ chucked by the chucking means 90a is introduced into the shell mold member via an opening 111 formed in a side portion of the shell mold member 110 (FIG. 4(a)). In this case, the chucking means 90a is moved slightly downward by the cylinder 82 of the transfer portion (FIG. 4(b)), and the molding material is placed on the lower mold member 114 (FIG. 4(c)).

Note that the chucking means 90b is moved to the second press portion $P_2$ at $T_{10}$, and is located above the table 66 at $T_{11}$. At $T_{11}$, the table 66 is moved slightly upward by the cylinder 62 of the heating portion, so that a second molding material on the table 66 is chucked by the chucking means 90b. Thereafter, the table 66 is moved slightly downward.

Subsequently, the arms 88a and 88b are pivoted, so that the chucking means 90b is moved to the second press portion $P_2$ ($T_{13}$). In the same manner as in the first press portion $P_1$, the molding material chucked by the chucking means 90b is introduced into the shell mold member 110 via the opening formed in the side surface of the shell mold member 110. The chucking means 90b is moved slightly downward by the cylinder 82, and the molding material is placed on the lower mold member 114.

The arms 88a and 88b are pivoted, and the chucking means 90b is returned from the second press portion to the middle position ($T_{14}$). The chucking means 90a is located above the table 66 at $T_{13}$, and is returned to the middle position at $T_{14}$.

In this manner, a state illustrated in FIG. 2 is established.

Press molding is executed in the two press portions ($P_1$ and $P_2$).

Figure 4A:
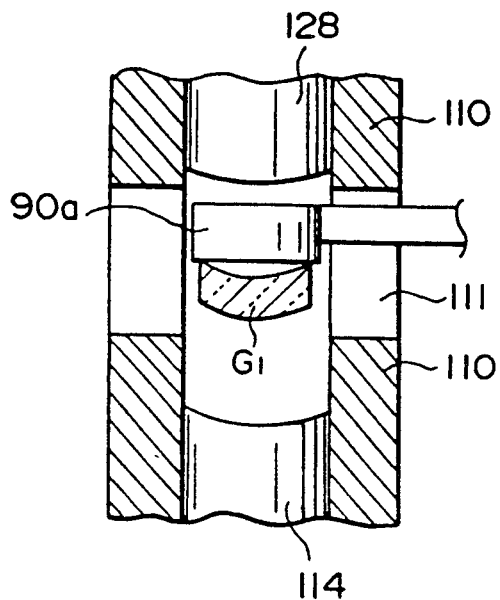
FIGS. 4(a) to 4(d) are sectional views of press portions of the apparatus for carrying out the process for manufacturing an optical element according to the present invention.
Figure 4B:
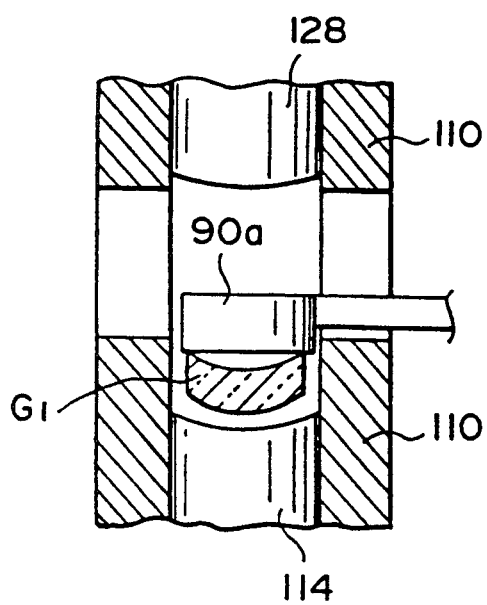
Figure 4C:
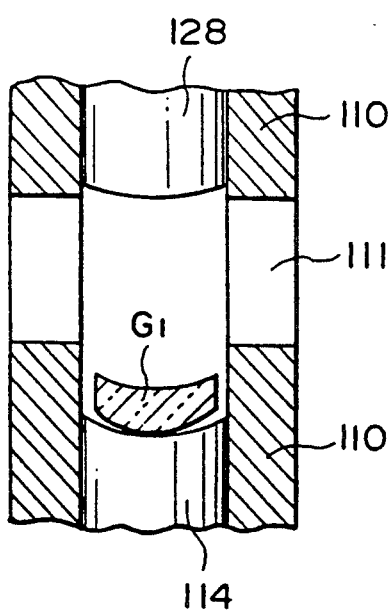

When the molding material $G_1$ is introduced into the shell mold member 110, the upper shaft 124 is pulled upward to its upper position by the cylinder 122. Thus, as shown in FIGS. 4(a) to 4(c), the upper mold member 128 is moved to its upper position in the shell mold member 110, and the opening 111 formed in the side portion of the shell mold member communicates with a cavity in the mold members. From this portion, the molding material $G_1$ is introduced into the cavity.

Figure 4D:
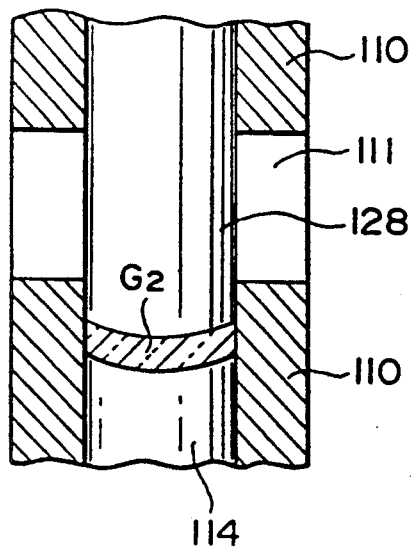

During press molding, the upper shaft 124 is moved downward by the cylinder 122, and the upper mold member 128 closes the opening 111 of the shell mold member 110, thus closing the cavity. Furthermore, the upper mold member 128 is pressed downward, thereby press-molding the molding material in the cavity. As a result, an optical element $G_2$ is formed (FIG. 4(d)). Note that the upper mold member 128 is moved downward until the lower end of the pressing ring 130 is in contact with the upper end of the shell mold member 110.

The press molding is performed for an appropriate period of time after the molding material is heated to have a molding enable viscosity by the heaters $H_1$, $H_2$, and $H_3$. After the material is molded to have a shape of the cavity, a coolant flows through the coolant communication paths $C_1$ and $C_2$, thereby cooling the molded optical element. During the cooling process, the lower mold member 114 is pressed upward by the cylinder 104 at a proper pressure (lower than a downward pressing force of the upper mold member 128 by the cylinder 122), thereby preventing formation of a sink mark due to shrinkage of the optical element.

Thereafter, the upper shaft 124 is moved upward to open the opening 111 of the side portion of the shell mold member.

In procedures almost opposite to an introduction operation of a molding material into the press portion 28, the chucking means 90a and 90b of the transfer portion 26 are moved to take out molded optical elements in the first and second press portions $P_1$ and $P_2$ by chucking. The molded optical elements are sequentially placed on the table 66 of the heating portion 24. Finally, the chucking means 90a and 90b are moved to the middle positions illustrated in FIG. 2 ($T_{15}$ to $T_{19}$).

The table 66 is moved upward by the cylinder 62 after $T_{13}$ and before $T_{15}$ ($T_e$) to be moved into the heating cylinder 68. After the table 66 is heated to an appropriate temperature, the table 66 is moved to the lower position illustrated in FIG. 1 ($T_f$). These operations are the same as those from $T_a$ to $T_b$.

In the same manner as the operations at $T_0$ to $T_6$, the gate valve 12 is opened, and new molding materials on the table 38 are chucked by the chucking means 50 in the transpose room 8. The molding materials are preheated, and are then conveyed into the heating portion 24 in the molding room 6 ($T_{20}$ to $T_{26}$).

Note that the timing $T_{25}$ is adjusted so that it is reached after $T_{19}$.

The table 66 is moved slightly upward, and the molded optical elements on the table 66 are chucked by the lower chucking portions of the chucking means 50. After the table 66 is moved slightly downward, the chucking means 50 is reversed ($T_{27}$). The table 66 is then moved slightly upward, and the molding materials chucked by the lower chucking portions as a result of the reverse operation are placed on the table 66.

In the same manner as the operations from $T_8$ to $T_9$, the chucking means 50 is moved from the heating portion 24 into the transpose room 8 ($T_{25}$). Thereafter, the gate valve 10 is closed ($T_{29}$).

In the same manner as the operations from $T_c$ to $T_d$, the table 66 which carries the molding materials is moved upward to its upper limit position by the cylinder 62 after $T_{28}$ and before $T_{29}$ ($T_g$). The table 66 is placed in the heating cylinder 68 for an appropriate period of time to be heated to an appropriate temperature. The table 66 is moved downward to the lower position illustrated in FIG. 1 after $T_{29}$ ($T_h$).

Thereafter, the same operations as those from $T_{10}$ to $T_{19}$ are executed in the transfer portion 26 and the press portion 28.

On the other hand, the gate valve 12 is opened ($T_{30}$), and the table 38 which carries new molding materials is moved upward ($T_{31}$). After the molding materials are chucked by the lower chucking portions of the chucking means 50 in the transpose room 8, the table 38 is moved slightly downward, and the convey shaft 48 is rotated through 180° by the rotary cylinder 52, thereby vertically reversing the chucking means 50 ($T_{32}$). The table 38 is moved slightly upward, and molded optical elements which are chucked by the lower chucking portions as a result of the reverse operation are placed on the table 38. The table 38 is moved downward to a position outside the transpose room 8 ($T_{33}$), and the gate valve 12 is closed ($T_{34}$).

With the above operations, the molding materials placed on the table 38 are press-molded, and are recovered on the table.

When the above-mentioned operations are repeated, press molding can be successively performed.

The preheating treatment in the transpose room 8 is performed to volatilize and remove foreign matters such as water content, organic components, and the like adsorbed in the surface of the molding materials. In this treatment, heating is performed at a reduced pressure.

Lenses each having a diameter of 26 mm were manufactured by changing the preheating conditions in the transpose room 8.

A molding material used in this case was SF8, and mold members prepared by forming a titanium nitride (TiN) thin film (thickness = 1 μm) on a surface of a base material formed of a carbide alloy were used. A temperature during press molding was 520° C., and a pressure (total pressure) was set to be 600 kg.

The preheating treatment in the transpose room 8 was performed under the following four sets of conditions (100 samples each).

| (1) | Degree of vacuum: | $10^{-1}$ Torr |
| --- | --- | --- |
| | Heating Temperature: | 300° C. |
| | Heating Time: | 3 minutes |
| (2) | Degree of vacuum: | $10^{-1}$ Torr |
| | Heating Temperature: | 400° C. |
| | Heating Time: | 1 minute |
| (3) | Degree of vacuum: | $5 \times 10^{-2}$ Torr |
| | Heating Temperature: | 300° C. |
| | Heating Time: | 3 minutes |
| (4) | Degree of vacuum: | $5 \times 10^{-2}$ Torr |
| | Heating Temperature: | 400° C. |
| | Heating Time: | 1 minute |

As a result, there was no damage such as cracking or welding of optical elements when any set of the above-mentioned conditions were used.

For the sake of comparison, when a molding material was press-molded without being subjected to the preheating treatment in the transpose room 8, 58% of the obtained optical elements were cracked.

The effects of the preheating treatment in the transpose room 8 as described above are based on the fact that (1) when the water content is removed from the surface of a molding material, the mold members can be prevented from being oxidized during press molding, and welding caused by the oxidized surfaces of the mold members can be suppressed (welding is often caused by the oxidized surfaces of the mold members), and (2) since the water content is removed from the surface of a molding material, the mechanical strengths of the mold members and a molded optical element can be increased, and destruction of the material and the molded optical element can be suppressed (since the surface of the molding materials suffers from many microcracks, the presence of foreign matters such as water content in the cracks causes a decrease in mechanical strength).

In the embodiment of the present invention, the preheating treatment in the transpose room 8 is executed by the heater incorporated in the chucking means 50. However, the transpose room 8 itself may comprise a heater for performing the preheating treatment.

As described above, according to the process for the present invention, since press molding is performed after a molding material is subjected to a preheating treatment at a reduced pressure, foreign matters attached to the surface of the molding material can be removed. Thus, welding between the material or a molded optical element and the mold members can be suppressed, and destruction of the material and the molded optical element can be prevented. Thus, a yield in the manufacture of optical elements can be increased, and the service life of the mold members can be prolonged. A range of materials used as the mold members can be widened, resulting in practical advantages.

What is claimed is:

1. A process for producing an optical element from a glass blank by heating the glass blank and press-molding it between molding members, comprising the steps of:

placing the glass blank in a vacuum transpose chamber;

maintaining a vacuum pressure in the transpose chamber at 10 Torr or less;

heating the vacuum transpose chamber to a temperature greater than 100° C. to remove water and organic components from the glass blank so as to prevent the glass blank and molding members from fusing together;

transferring the glass blank to a vacuum molding chamber;

heating the glass blank to a predetermined molding temperature; and press-molding the glass blank to form an optical element.

2. A process for producing an optical element according to claim 1, wherein the optical element is an optical lens.

3. A process for producing an optical element according to claim 1, wherein the vacuum pressure in the transpose chamber is maintained at $10^{-1}$ Torr or less.

* * * * *